March 30, 1965
C. W. KISTNER
3,175,710
BOAT TRAILER
Filed Oct. 3, 1960
7 Sheets-Sheet 1
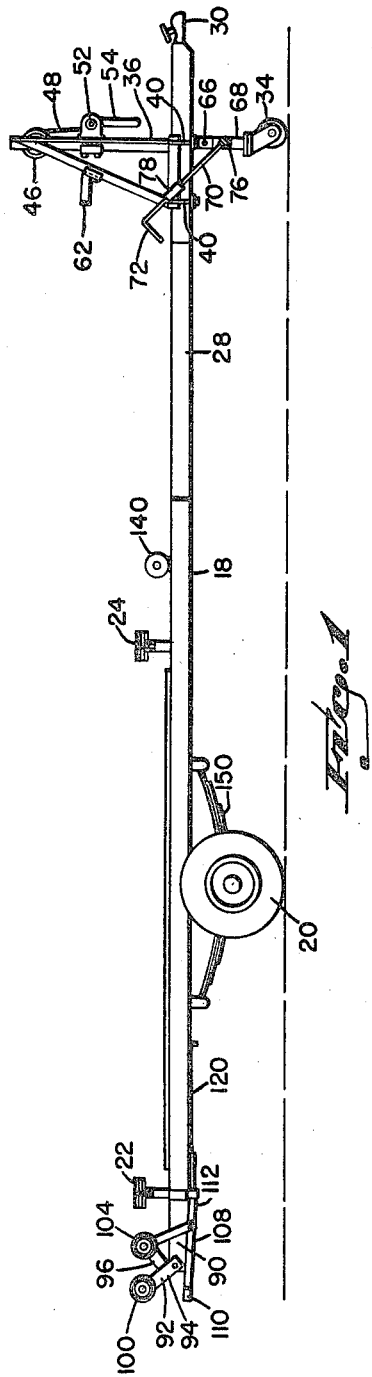
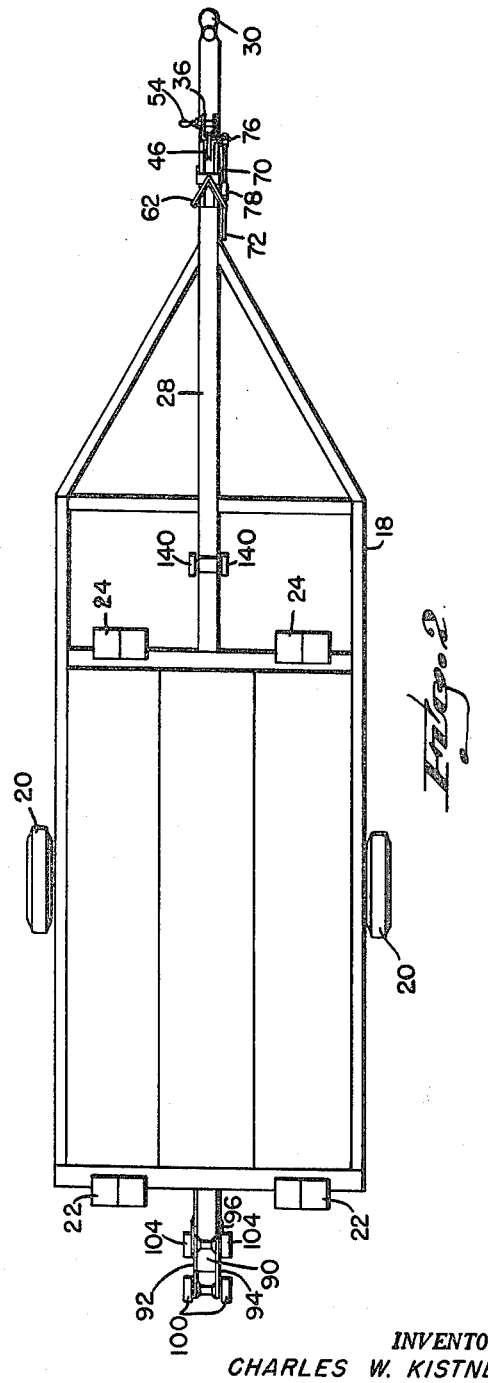
INVENTOR.
CHARLES W. KISTNER
BY
*J. Warren Kinney, Jr.*
ATTORNEY March 30, 1965 C. W. KISTNER 3,175,710
BOAT TRAILER
Filed Oct. 3, 1960 7 Sheets-Sheet 2
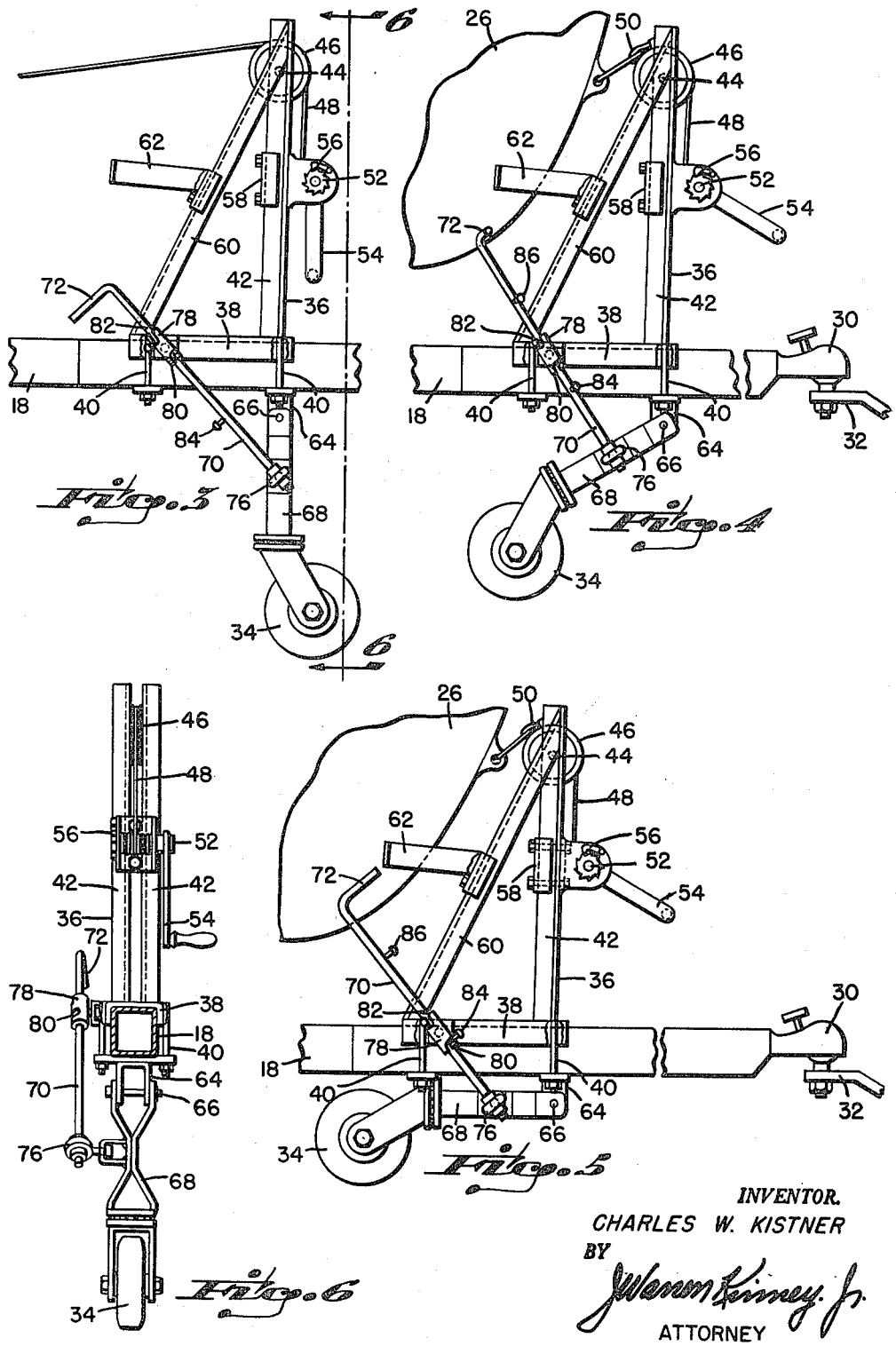
INVENTOR.
CHARLES W. KISTNER
BY
ATTORNEY March 30, 1965  C. W. KISTNER  3,175,710
BOAT TRAILER
Filed Oct. 3, 1960  7 Sheets-Sheet 3
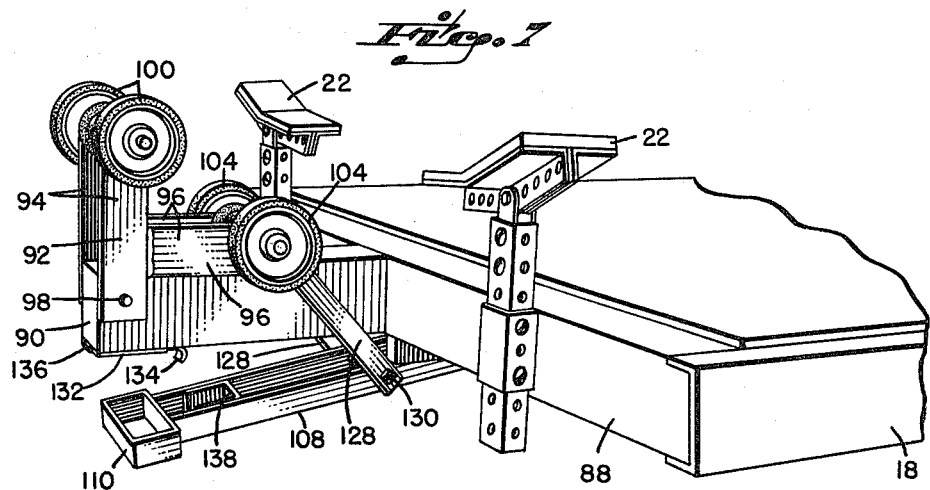
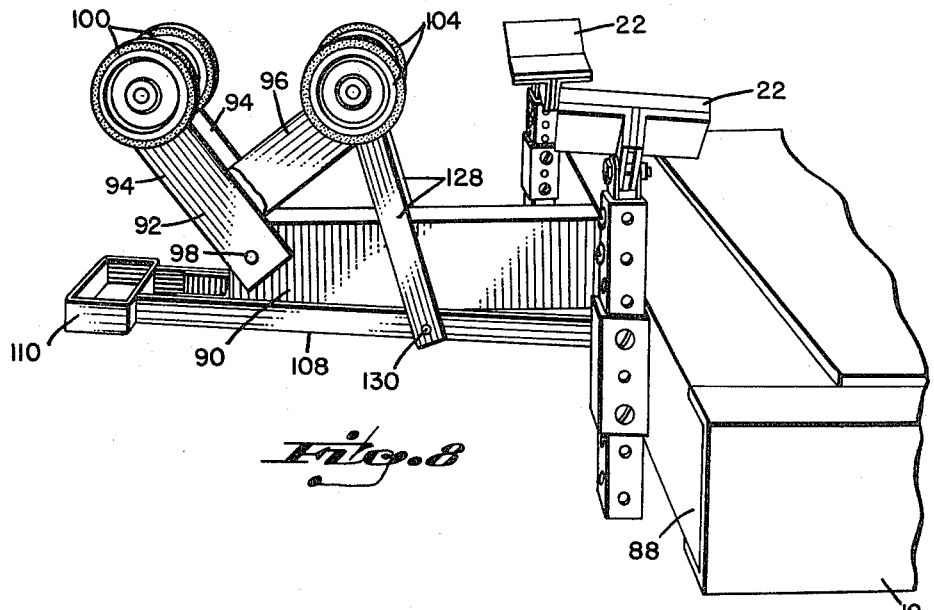
INVENTOR.
CHARLES W. KISTNER
BY
ATTORNEY

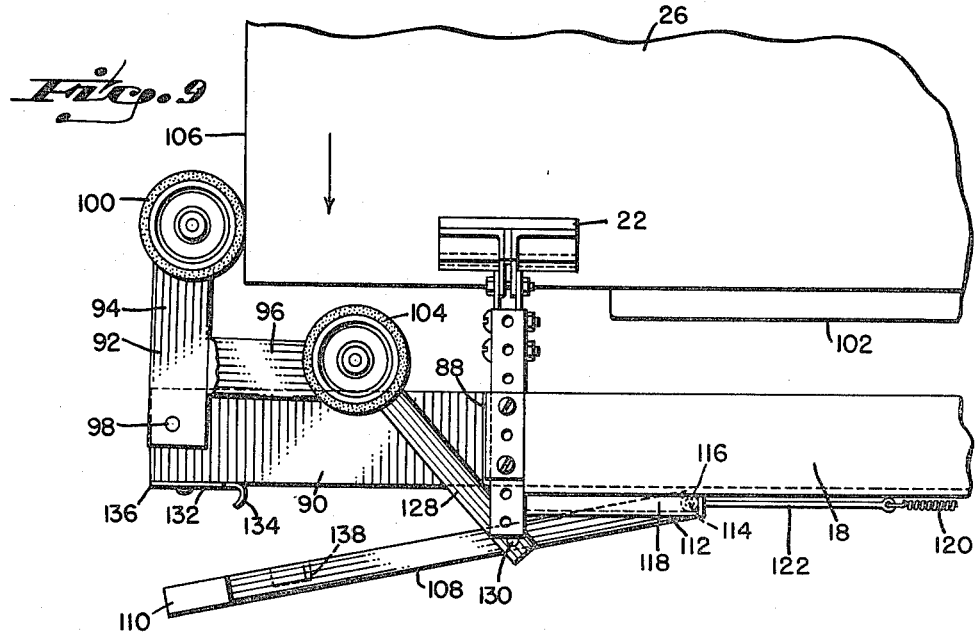
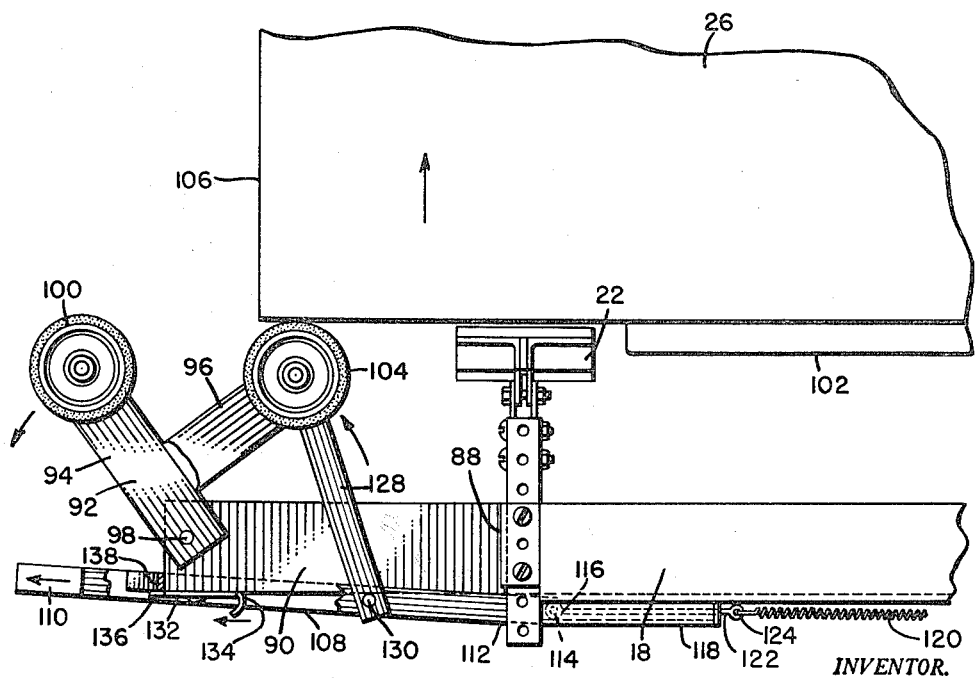

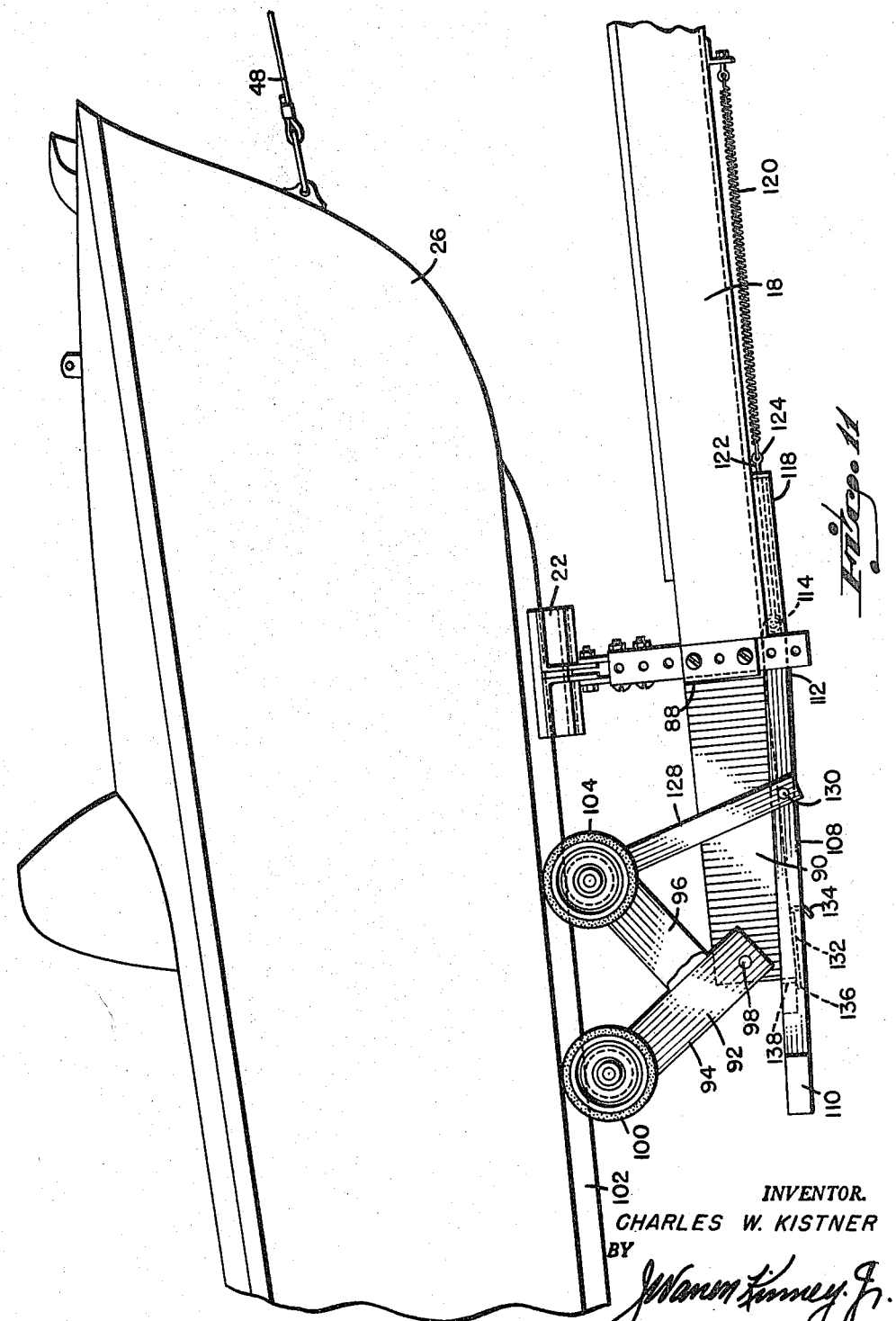

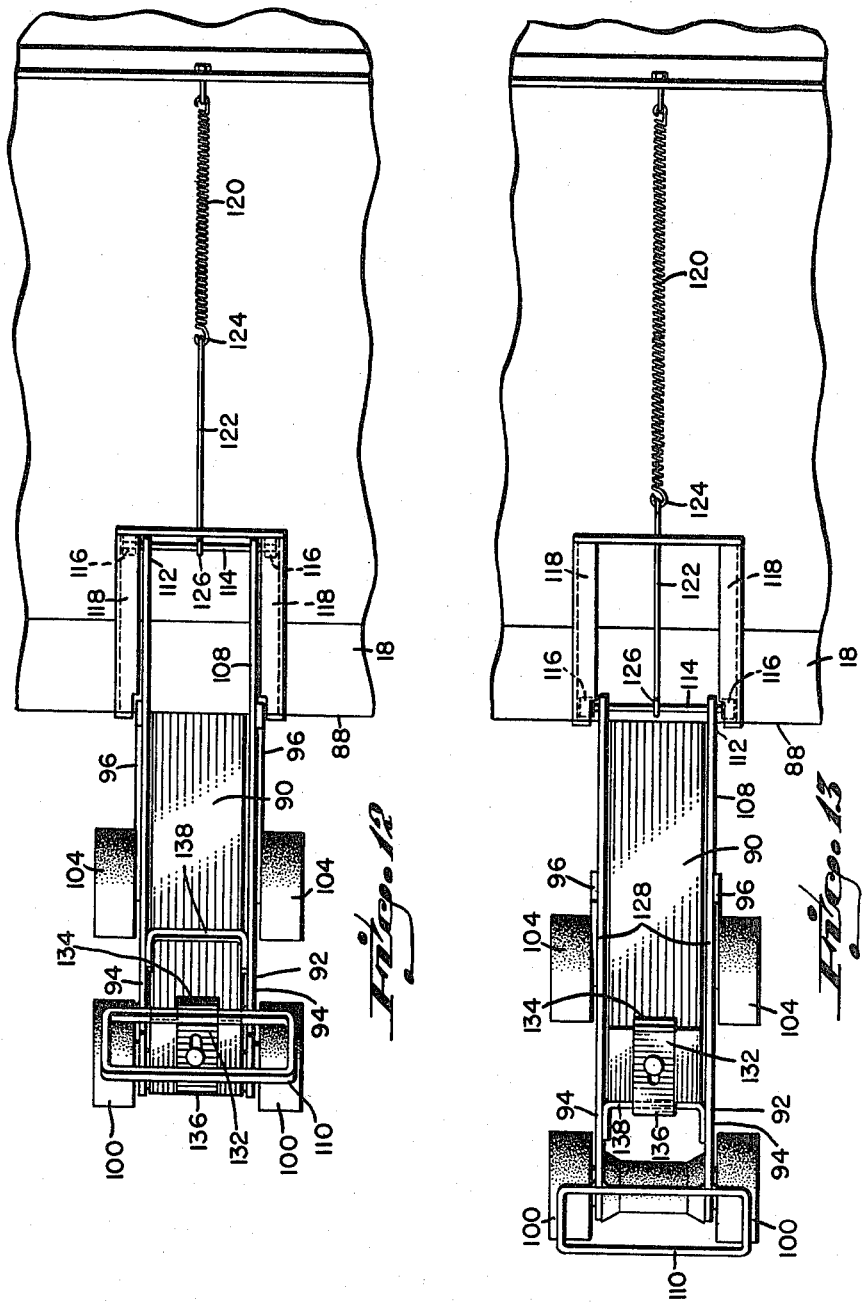

March 30, 1965   C. W. KISTNER   3,175,710
BOAT TRAILER

Filed Oct. 3, 1960   7 Sheets-Sheet 7

INVENTOR.
CHARLES W. KISTNER
BY
ATTORNEY

United States Patent Office 3,175,710
Patented Mar. 30, 1965

3,175,710
BOAT TRAILER
Charles W. Kistner, 6954 Gilbert Ave.,
North College Hill, Ohio
Filed Oct. 3, 1960, Ser. No. 59,900
12 Claims. (Cl. 214—84)

The present invention relates to a boat trailer, of the type generally towed by a land vehicle to and from the shore line of a body of water. As is usual, the trailer has a hitch connection upon the rear of a vehicle, and is adapted to be backed into the water a limited distance when launching the boat or when removing it from the water.

An object of the invention is to provide improved means in association with a boat trailer, for facilitating and expediting launching and recovering a boat from the water, with a minimum of effort and assistance.

Another object is to provide means for launching a boat from a trailer, and recovering it for transport, with safety and dispatch and without injury to the boat during the process.

Another object is to provide means simple and inexpensive of construction, to balance the load upon the trailer and to safely secure the boat thereon during transport.

A further object of the invention is to provide a highly effective winch and jack unit for attachment to a trailer in adjusted positions upon the draw bar of the trailer, the unit being applicable to many different types of trailers.

Another object is to provide a boat trailer with means to minimize sway as the trailer is towed by a land vehicle, thereby ensuring safety of transport at high speed.

The foregoing and other objects are attained by the means described herein and illustrated upon the accompanying drawings, in which:

FIG. 1 is a side elevational view of the boat trailer embodying the improvements of the present invention.

FIG. 2 is a top plan view of the same.

FIG. 3 is a fragmentary enlarged side elevation of the winch and jack unit at the forward end of the trailer, the jack wheel being lowered to support the forward end of the trailer.

FIG. 4 is a view similar to FIG. 3, but showing the jack wheel partly elevated while the forward end of the trailer is supported upon a hitch.

FIG. 5 is a view similar to FIG. 4, and showing the jack wheel fully elevated or retracted.

FIG. 6 is a cross-sectional view taken on line 6—6 of FIG. 3.

FIG. 7 is a perspective view of the rear end of the trailer, showing in detail a transposable carriage, the carriage in this illustration being tilted to retain the boat against accidental displacement off the rear of the trailer.

FIG. 8 is a view similar to FIG. 7, showing the transposable carriage in operative position for launching or for loading the boat relative to the trailer.

FIG. 9 is a side elevational view of the transposable carriage showing its relationship to a boat as retained upon the trailer.

FIG. 10 is a view similar to FIG. 9, showing the carriage in operative position for launching the boat from the trailer.

FIG. 11 is a fragmental side elevational view showing a boat with its bow end supported upon the carriage, as when launching or replacing the boat with relation to the trailer.

FIG. 12 is a fragmental bottom view of the carriage structure in the home position of FIG. 9.

FIG. 13 is a fragmental bottom view of the carriage structure in the operative position of FIG. 10.

Figure 14:
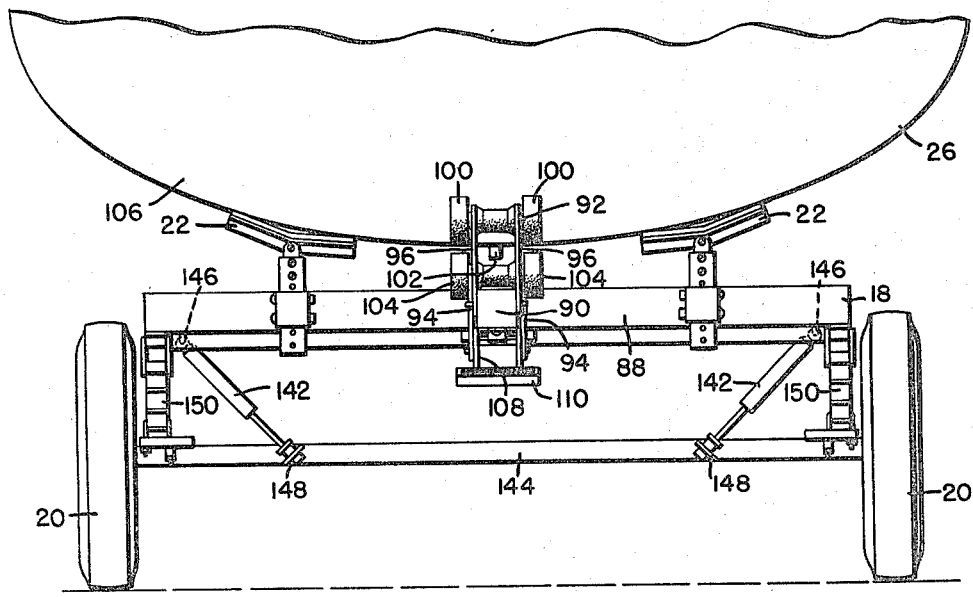
FIG. 14 is a rear view of the trailer with the carriage structure in the retaining position of FIG. 9.

Referring to the drawings, 18 indicates a chassis spring-supported by a pair of running wheels 20—20, and having suitable adjustable pads 22—22 and 24—24 for supporting a boat 26 for transport. The chassis includes a draw bar or tongue 28 which extends forwardly along a line that bisects the chassis, and has at its free forward end a hitch element 30 whereby the tongue or draw bar may be selectively attached to a road vehicle through the intermediary of a complementary hitch element 32 secured to the rear portion of the vehicle.

Behind the hitch element 30, and mounted upon the draw bar 28, is a jack wheel 34 which may be elevated or retracted to the FIG. 5 position when the trailer is attached to the vehicle, or, as shown in FIGS. 1 and 3, the jack wheel may be lowered or extended to support the forward end of the trailer when detached from the vehicle at the hitch elements. The jack wheel is adjustable along the length of the draw bar, as will be explained.

As indicated upon FIGS. 3 to 6, inclusive, the jack wheel is associated with a winch comprising a frame 36 upstanding upon draw bar 18, said frame including an inverted channel member 38 embracing the sides of the draw bar, and held in position thereon by suitable fastening devices such as U-bolts 40. The draw bar preferably, though not necessarily, is of rectangular cross-sectional shape as shown in FIG. 6.

The upstanding post of the winch may comprise a pair of spaced parallel angle irons 42—42, the lower ends of which may be welded or otherwise fixed to the elongate channel member 38. Near the upper ends of angle members 42—42, a shaft 44 connecting the angle members supports a pulley 46 over which is trained a cable or rope 48. One end 50 of the cable or rope is detachably securable to the bow of the boat 26, whereas the opposite end thereof is wound upon a winch shaft 52. The winch shaft may be rotated by means of a crank 54, to draw the boat onto the trailer by means of the cable or rope 48. The winch preferably includes a pawl and ratchet wheel arrangement 56 to preclude retrograde movement of the boat during and after being drawn onto the trailer.

The winch may be secured to the upright post 42—42 of the winch frame by means of a suitable bracket 58 bolted thereto. The post 42—42 may be stabilized by means of a brace 60 fixed at opposite ends to the ends of the post members 42—42 and to the base channel member 38. A yoke 62 fixed to the brace may serve to embrace the prow of the boat when pulled to the extreme forward position by the winch action.

It will be noted that the winch frame may be adjusted as to its position lengthwise upon draw bar 18 by loosening the nuts of U-bolts 40—40, thereby to position the boat for proper coordination with the mechanism at the rear of the trailer for effective handling of the boat in launching and restoring it to position upon the trailer. The jack wheel is arranged unitarily with the winch structure, by incorporating therewith a depending bracket 64 upon which is pivoted, at 66, the retractible leg 68 of the jack wheel. The leg 68 may be moved from a substantially horizontal position to a substantially vertical position, as illustrated by FIGS. 5 and 3.

The means for shifting leg 68 may comprise an operating rod 70 having at its upper end a handle 72, whereas the lower end 74 is rotatably supported in a bearing 76 fixed upon leg 68. Intermediate the ends of rod 70, the rod is supported for reciprocation and rotation within a sleeve 78 mounted upon channel member 38. Sleeve 78 may carry a pair of latching devices, such as bayonet slots 80 and 82 adapted upon rotation and reciprocation of rod 70 to engage and disengage pins 84 and 86 for holding the rod in extended and retracted positions. FIG. 3 shows the operating rod extended for latching the leg of the jack wheel in lowered position, while FIG. 5 shows the rod retracted for holding the wheel in elevated position, the pin 84 being in this instance engaged with the bayonet slot 80.

To lower the jack wheel, it is necessary only to rotate rod 70 slightly by means of handle 72, thereby to disengage the latch device 80–84 so that rod 70 may be advanced manually downwardly to swing the jack wheel leg downwardly about its pivot 66. The leg may then be latched in the lowered position by slightly turning the handle 72 to place pin 86 in engagement with slot 82.

It should here be noted that loosening of the nuts of U-bolts 40—40 permits unitary shifting of both the jack wheel apparatus and the winch assembly, lengthwise along draw bar 28 for purposes of adjustment as previously stated. The jack wheel preferably is of the swivel caster type, indicated upon the drawings. As will be understood, the operating rod sleeve 78 may rock slightly at its mounting upon channel member 38, to avoid binding of the rod therein as the rod is reciprocated longitudinally in elevating and lowering the wheel 34.

Extending rearwardly at right angles from the rear strut 88 of the trailer chassis, is a rigid tongue or bracket 90, the function of which is to provide support for the tiltable roller carriage 92. Carriage 92 may comprise arms 94—94 and 96—96, these arms being rigidly secured to one another at approximate right angles for unitary rocking movement about a pivot means 98. At the free outer ends of arms 94—94 is rotatably mounted a pair of transversely spaced rollers 100, preferably carrying resilient tires as indicated, upon which the boat bottom may roll as the boat is moved onto and off the trailer. The rollers are spaced apart to contact the boat bottom at opposite sides of the keel 102.

A similar pair of transversely spaced rollers 104 is rotatably supported upon the free outer ends of arms 96, to likewise support the boat bottom. As will be observed from an examination of FIGS. 9 and 10, the carriage comprising arms 94 and 96 may be rocked about its pivot 98 on tongue 90, to assume either of two selected positions. In the position of FIG. 9, rollers 100 are swung against the rear vertical surface of the transom board 106 of the boat, to block any tendency of the boat to shift rearwardly relative to the trailer. At the same time, rollers 104 are lowered from the hull of the boat allowing it to rest upon the adjustable pads 22.

When the carriage 92 is swung to the FIG. 10 position, rollers 104 perform as jacks or lifters to elevate the boat hull off the pads 22, and rollers 100 assume a position level with rollers 104 to accept part of the load as the boat is moved lengthwise off or onto the trailer. For purposes of identification, rollers 104 may be referred to as lifters or lifting rollers, and those indicated at 100 may be considered retainers or transom stop rollers. Both sets of rollers, however, may perform to support the boat bottom as the boat is shifted from or onto the trailer, as indicated by FIG. 11.

The means for tilting roller carriage 92 may comprise a reciprocable and rockable actuator 108 having a handle end 110 and a fulcrum end 112. The fulcrum end of the actuator may carry a cross shaft 114 having opposite ends carrying slide blocks or rollers 116 adapted to travel lengthwise of the trailer in a pair of spaced parallel fixed channel members or tracks 118 welded or otherwise rigidly secured to the trailer chassis. Rollers or blocks 116 may be shifted by means of handle 110 and actuator 108, between the limits of the ends of tracks 118, these limits being indicated upon FIGS. 9 and 10.

A tension spring 120, FIGS. 12 and 13, serves constantly to urge the actuator 108 in the direction of the front of the trailer, through the agency of a connecting rod 122 having opposite ends attached to the spring at 124, and to the cross shaft 114 at 126.

Attached to the actuator 108 at a point intermediate its ends, is a pair of toggle arms 128, the connection here being shown at 130 as a pivot or rock shaft. The opposite or upper end of each toggle arm is pivoted upon or near the free end of each roller arm 96, so that upon reciprocation of actuator 108, the toggle arms will move carriage 92 to either of the positions indicated by FIGS. 9 and 10. As will be understood, spring 120 tends always to urge the carriage 92 to the tilted position of FIG. 9, at which the rollers 100 engage the rear vertical surface of the transom board of the boat for retaining the boat against accidental displacement off the rear of the trailer.

Indicated at 132 is a slide latch, shiftable by means of a handle or finger piece 134, in the direction of extension of actuator 108. The latch may have a projection 136 disposable as in FIG. 10 to slide beneath a transverse fixed strut 138 of the actuator, for holding the actuator in raised and withdrawn position countering the force of spring 120. In the withdrawn and latched position of FIG. 10, the actuator 108 securely holds the roller carriage 92 in position for support of the boat in moving it off or onto the trailer.

When latch 132 is shifted manually to release the actuator 108, as in FIG. 9, the spring 120 operates to tilt the carriage 92 to position for blocking the boat transom board by means of the rollers 100, FIG. 9. It will here be noted that the boat bottom has been automatically lowered onto the pads 22, by retraction of the rollers 104. The character 140 of FIG. 1 indicates a freely rotatable pair of rollers on draw bar 28, for guiding the boat keel onto the forward pads 24 as the boat is loaded onto the trailer incident to operation of winch 52. All of the pads shown may be made adjustable as to elevation, in accordance with common practice.

Figure 15:
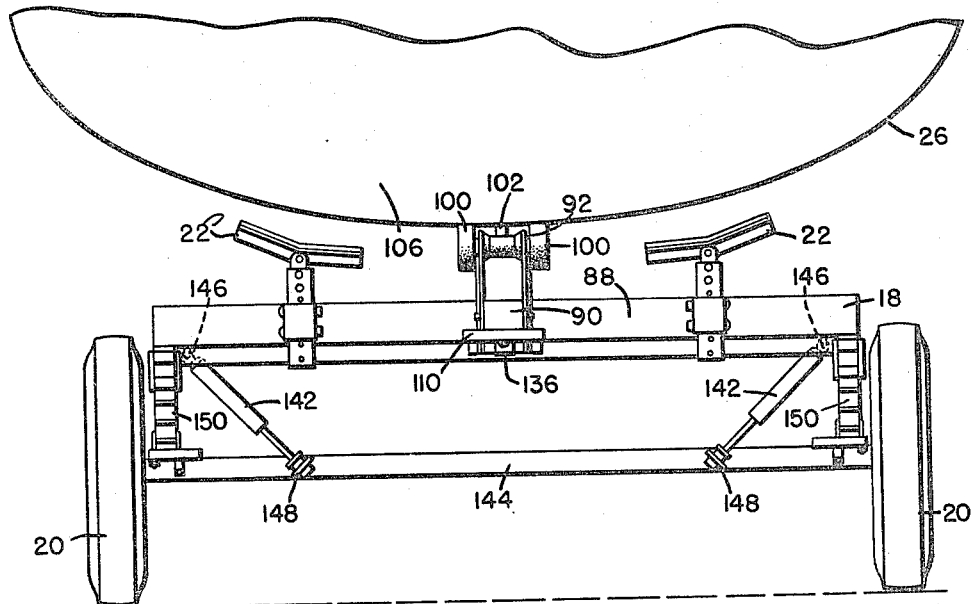
FIG. 15 is a rear view of the trailer with the carriage in the operative boat-supporting position of FIG. 10.

With reference to FIGS. 14 and 15, attention is directed to the hydraulic or pneumatic shock absorbers 142, inclined obliquely to the wheel axle 144, for precluding sway of the trailer frame while the trailer is in motion. The cylinder of each shock absorber is shown pivoted to the frame at 146, whereas its piston rod is anchored to the axle at 148. The trailer frame may be supported upon leaf springs 150, or upon other types of springs as may be desired.

The mechanism disclosed for loading and unloading a boat relative to a trailer is simple of operation and highly effective for ensuring safety of manipulation by a single operator. The possibility of inflicting damage to the boat during loading, unloading, and transport, has been reduced to a practical minimum by the means of the invention disclosed herein.

It is to be understood that various modifications and changes in the structural details of the apparatus may be resorted to, within the scope of the appended claims, without departing from the spirit of the invention.

What is claimed is:

1. In a boat trailer, the combination of a chassis including pads for supporting a boat, said chassis having a front end and a rear end, a draw bar extending from the front end of the chassis, means supported on the rear of the chassis for swinging movement in a vertical plane extending longitudinally of the chassis, for engaging and pressing against the rear vertical surface of the transom board of a boat supported upon the pads and tending to urge the boat toward the front end of the chassis, and a winch including a prow support, mounted upon the draw bar for forward and rearward adjustment position with respect to said transom board engaging means.

2. The device as set forth in claim 1, wherein the combination includes spring means for constantly urging the transom board engaging means toward and against the said rear vertical surface of the transom board while the boat rests upon the pads.

3. In a boat trailer, the combination of a chassis including supporting means for a boat bottom, roller means to selectively support the boat bottom, means for elevating the roller means to lift the boat bottom from the supporting means preparatory to loading and unloading the boat with relation to the trailer chassis, a second roller means movable with the roller means first mentioned, said second roller means being selectively disposable to a position for supporting the boat bottom, and to a second position for engaging the boat transom to block shifting of the boat bodily in one direction lengthwise of the trailer chassis.

4. In a boat trailer, the combination of an elongate chassis having forward and rear ends, boat hull support means on the chassis for support of the boat lengthwise of the chassis during transport, a rigid tongue extending from the rear of the chassis, a carriage including arms fixed to one another forming a bell crank, means pivoting the carriage upon the tongue at the approximate location of intersection of the arms, said arms having free ends remote from the pivot means, a pair of spaced rollers rotatably mounted at the free end of each arm, said rollers being bodily movable with the carriage about the carriage pivot means, an actuator shiftable lengthwise beneath the tongue, and toggle means connecting the actuator to the carriage for tilting the carriage about its pivot means incident to shifting of the actuator, the length of the carriage arms being such that tilting of the carriage in one direction disposes the rollers of one arm in abutment against the back of the boat transom, and tilting in the opposite direction projects the remaining rollers upwardly against the hull for lifting the latter from contact with the hull support means.

5. The combination as set forth in claim 4 wherein is included means to selectively latch the carriage in position for support of the hull by said remaining rollers.

6. In a boat trailer, the combination of an elongate chassis having forward and rear ends, boat hull support means on the chassis for support of the boat lengthwise of the chassis during transport, a rigid tongue extending from the rear of the chassis, a carriage including arms fixed to one another forming a bell crank, means pivoting the carriage upon the tongue at the approximate location of intersection of the arms, said arms having free ends remote from the pivot means, a pair of spaced lifting rollers rotatably mounted at the free end of one arm, and a pair of spaced transom stop rollers rotatably mounted at the free end of the remaining arm, said rollers being bodily movable with the carriage about the carriage pivot means, an actuator shiftable lengthwise beneath the tongue, and toggle means connecting the actuator to the carriage whereby lengthwise reciprocation of the actuator is translated into tilting movement of the carriage about its pivot means, the length of the carriage arms being such that tilting of the carriage in one direction disposes the transom stop rollers against the back of the boat transom, and tilting in the opposite direction directs the lifting rollers upwardly against the hull for lifting the latter from contact with the hull support means, means to selectively latch the carriage in position for support of the hull by said lifting rollers, and resilient means operative upon release of the latch, for urging the carriage into position for placing the transom stop rollers against the back of the boat transom.

7. In a boat trailer, the combination of a chassis including supporting means for a boat bottom, first and second roller means to selectively support the boat bottom, means for vertically moving the said roller means as a unit to effect lifting of the boat bottom from said supporting means by the first said roller means preparatory to unloading the boat from the chassis and for simultaneously placing the second said roller means in a position to subsequently engage the boat bottom for supporting the latter cooperatively with the said first roller means, the said roller means being adapted to be positioned at an elevation above said supporting means and to bear against the rear surface of the transom board of a boat resting on the supporting means when the said first roller means is in a non-lifting position beneath the boat bottom.

8. In a boat trailer, the combination of a chassis having a front end and a rear end, a draw bar extending from the front end of the chassis, means spaced longitudinally on the chassis for engagement by and support of a boat hull, said means including a pair of rests spaced apart transversely of the chassis adjacent to the rear end thereof, a tiltable roller carriage supported on the chassis rearwardly of and adjacent to said pair of rests for oscillation on an axis extending transversely of the chassis, said carriage comprising forward and rearward arms rigidly joined in substantially V formation, forward and rearward roller means on said arms movable as a unit between a forwardly tilted position and a rearwardly tilted position, the said forward roller means being elevated from a lowered position and adapted to engage and elevate a boat bottom from said rests when the carriage is moved to the rearwardly tilted position and said rearward roller being moved to an elevated position and adapted to bear against the rear surface of the transom of a boat supported on said rests when the carriage is moved to the forwardly tilted position, and means operatively coupling said carriage with the chassis for facilitating said tilting of the carriage and for holding the carriage in each of its tilted positions.

9. The combination according to claim 8, wherein said rearward roller means is moved downwardly away from its bearing against the boat transom simultaneously with the elevation of the forward roller means and to a position in which the two roller means are disposed to be engaged by and to share in the support of the boat hull in the unloading and loading of the latter.

10. In a boat trailer, the combination of an elongate chassis having forward and rear ends, hull support means on the chassis for supporting a boat lengthwise of the chassis during transport, a draw bar rigid with and forming a unitary forward end extension of the chassis and having means at its forward end for attachment to a road vehicle, a slide element consisting of an elongate inverted channel member on and embracing the sides of the draw bar for sliding adjustment longitudinally thereon, an upstanding frame on said slide element, a pulley rotatably supported on the top portion of said frame, a cable winch on the forward side of the frame below said pulley, clamping means securing said slide element in an adjusted position on the draw bar, a bracket attached to and depending from said clamping means on the underside of the draw bar, a jack wheel leg pivotally joined at one end to said bracket to swing on a transverse axis from a substantially vertical position to a position substantially parallel with the underside of the draw bar, a wheel rotatably attached to the other end of the leg, and means operatively connecting the leg with a side of said slide element for facilitating swinging said leg on said pivot and for securing the leg in its vertical and horizontal positions.

11. The combination according to claim 10, wherein the last stated means comprises a sleeve having a pivot coupling at the side thereof with the slide element for turning on a transverse axis, the sleeve having bayonet slots in the end edges thereof, a rod passing downwardly and forwardly through the sleeve and longitudinally movable therein, a pair of spaced pin members on said rod having said sleeve therebetween and selectively engageable in said bayonet slots, and a pivot coupling between the lower end of the rod and said wheel leg.

12. The combination according to claim 10, with a stabilizer brace attached at one end to the upper portion of said frame and extending downwardly and rearwardly therefrom and secured at its lower end to said slide element and a yoke fixed to said brace and facing rearwardly therefrom to receive and support the prow of a boat.

References Cited in the file of this patent
UNITED STATES PATENTS

| | | |
|---|---|---|
| 2,586,485 | Schroeder | Feb. 19, 1952 |
| 2,834,492 | Roy et al. | May 13, 1958 |
| 2,847,136 | Neff | Aug. 12, 1958 |
| 2,889,946 | Holsclaw | June 9, 1959 |
| 2,895,629 | Truxall | July 21, 1959 |
| 2,923,425 | Gallotta, et al. | Feb. 2, 1960 |
| 3,056,520 | Rutigliano | Oct. 2, 1962 |
| 3,077,998 | Balko et al. | Feb. 19, 1963 |